(12) United States Patent
Arseneau et al.

(10) Patent No.: US 7,111,790 B2
(45) Date of Patent: Sep. 26, 2006

(54) CARD DISPENSING UNIT AND METHOD FOR DISPENSING CARDS

(75) Inventors: Gary Arseneau, Plantsville, CT (US); Eugene Domnich, West Hartford, CT (US)

(73) Assignee: Greenwald Industries, Incorporated, Chester, CT (US)

(*) Notice: Subject to any disclaimer, the term of this patent is extended or adjusted under 35 U.S.C. 154(b) by 76 days.

(21) Appl. No.: 10/732,560

(22) Filed: Dec. 10, 2003

(65) Prior Publication Data

US 2005/0127186 A1 Jun. 16, 2005

(51) Int. Cl.
 *G06K 13/00* (2006.01)
(52) U.S. Cl. .......................... 235/475; 235/383
(58) Field of Classification Search .............. 235/475, 235/383, 385, 476 V, 483, 485
See application file for complete search history.

(56) References Cited

U.S. PATENT DOCUMENTS 5,133,615 A * 7/1992 Saito et al. ................ 400/621
5,768,143 A * 6/1998 Fujimoto ................... 700/235
5,974,961 A * 11/1999 Kazo et al. .................. 101/4

* cited by examiner

*Primary Examiner*—Daniel St Cyr
(74) *Attorney, Agent, or Firm*—Cantor Colburn LLP (57) ABSTRACT

Disclosed herein is a card dispensing unit including a stack guide assembly configured to receive a stack of cards, an encoder to encode said stack of cards, wherein said encoder is positioned in relation to said stack guide assembly to receive a consistent impingent force from said stack of cards: And a push block in operable communication with the guide assembly is also provided to selectively move the cards pursuant to a controllable position linear actuator which is in operable communication with the push block.

24 Claims, 11 Drawing Sheets

CARD DISPENSING UNIT AND METHOD FOR DISPENSING CARDS

BACKGROUND

Alternatives to cash money have traditionally been checks, credit cards and debit cards. More recently however, another alternative has become available. These are often called smart cards. Smart cards employ a programmable chip, in the modern incarnation, which chip stores information such as a credit amount on the card, and sometimes where and with what equipment the card is useable, smart cards are ubiquitous in overseas locales and are becoming more often used in this country as a substitute for cash, particularly in certain industries. Specifically, one example of an industry where these cards have become prevalent is in commercial laundromats. While certainly there are many other venues for this technology, the above is a common example. Cards are purchased by a user for a certain sum of money with excess deposited money being encoded on the card as a credit. The card may then be inserted into readers attached to a particular device where a debit will take place and the device will become operational.

There are several manufacturers of such cards and several different types of cards. Each manufacturer also supplies card dispensers, card encoders and card readers. In each case, there are drawbacks to the prior art dispensers, encoders and readers. Since improvements are always welcomed, a device and method according to the following disclosure, which overcomes all of the art recognized drawbacks of the prior art devices and methods will be well received by the art.

SUMMARY

Disclosed herein is a card dispensing unit. The unit includes a stack guide assembly configured to receive one or more cards. A push block in operable communication with the guide assembly is also provided to selectively move the cards pursuant to a controllable position linear actuator which is in operable communication with the push block.

Further disclosed herein is a method for dispensing cards. The method includes recognizing an indicator to dispense a card. Once the indicator is recognized, an action is taken resulting in linearly urging a card from a stack of one or more cards toward an ejection area with a controllable position linear actuator.

BRIEF DESCRIPTION OF THE DRAWINGS

Referring now to the drawings wherein like elements are numbered alike in the several Figures.

DETAILED DESCRIPTION

For purposes of clarity in the following discussion it is noted that the first portion of the detailed description is focused upon identification of components with only minimal interjection of process oriented commentary. Such commentary is included where it is deemed of assistance with respect to identification of components. Following completion of component identification, a discussion of operation of the unit will commence.

Figure 1:
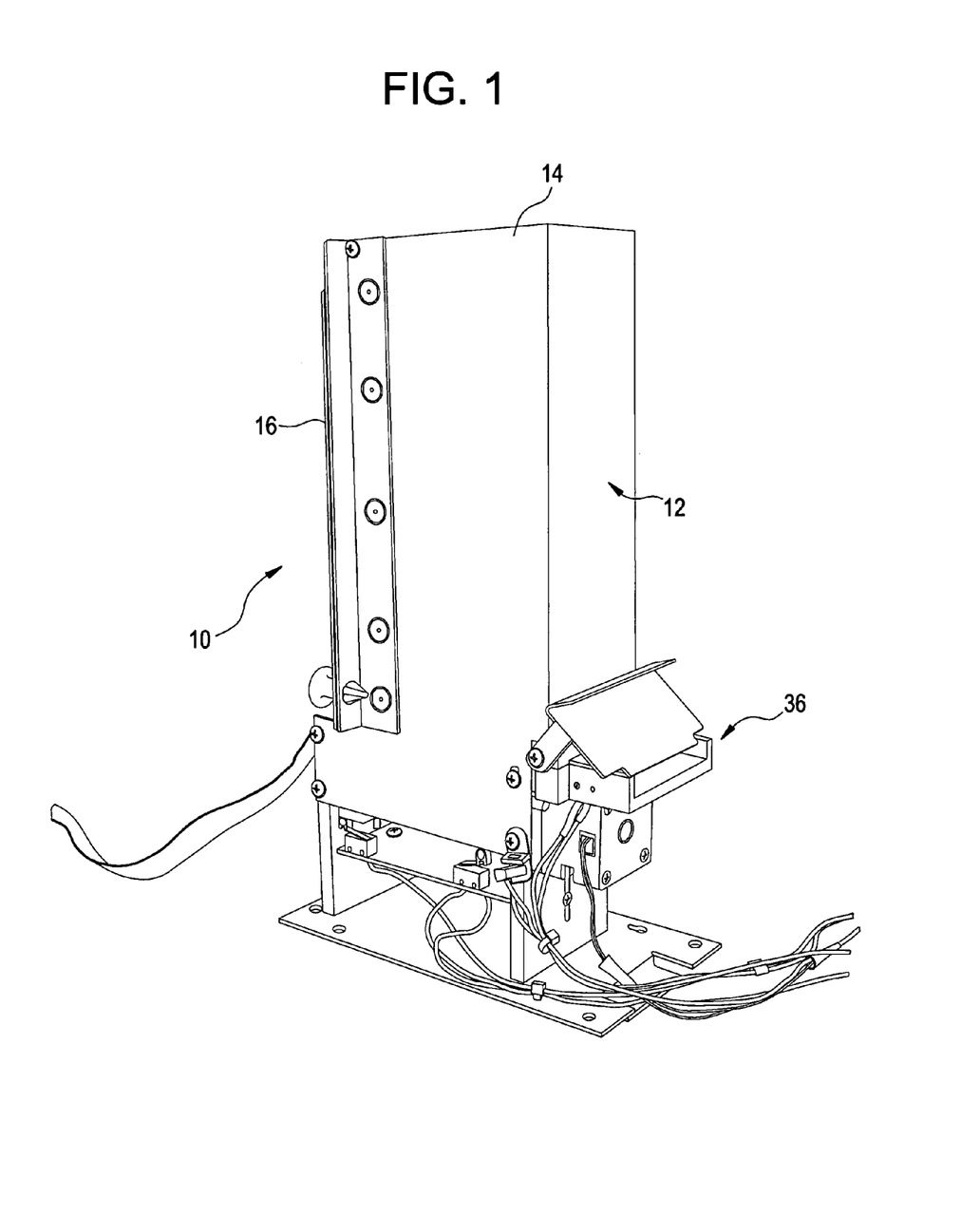
FIG. 1 is a front/side perspective view of a card dispensing unit.
Figure 2:
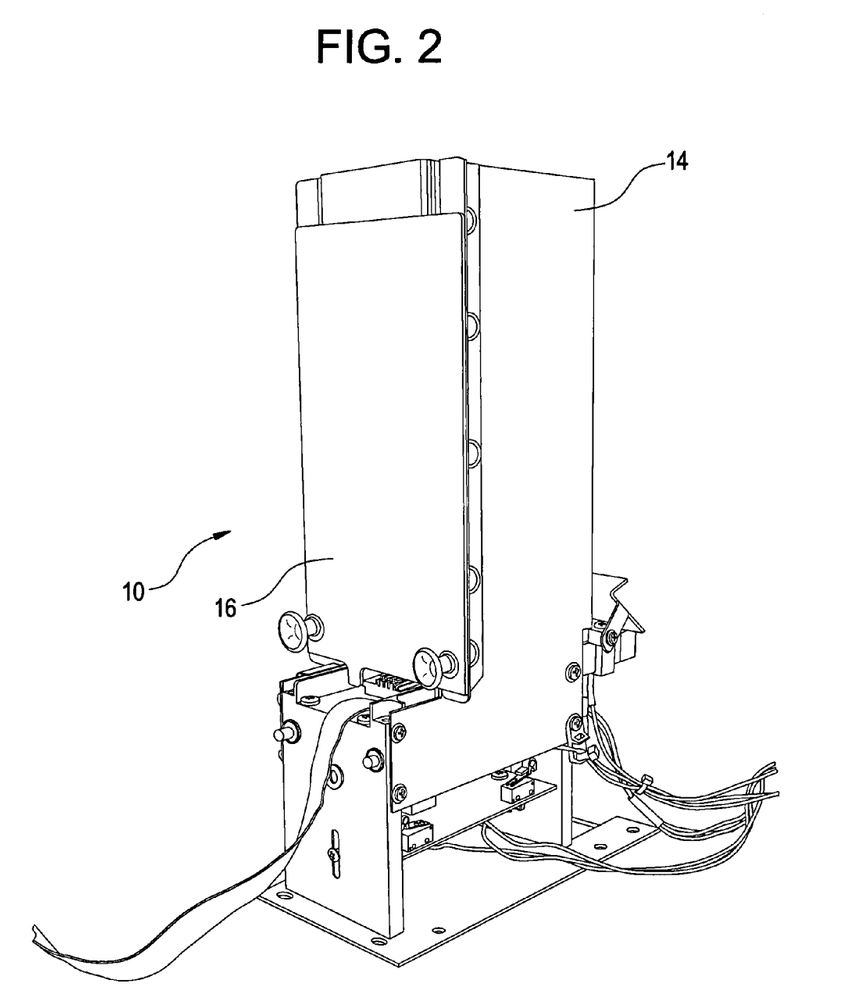
FIG. 2 is a rear/side perspective view of the card dispensing unit.

Referring to FIGS. 1 and 2 a card dispensing unit 10 representative of the disclosure herein is illustrated from a front and a rear corner, respectively, isometrically. These are intended primarily to provide an overview of the unit.

Referring to FIGS. 1, 2, 3A, 4A and 4B, a stack guide 12 is visible. Stack guide 12 includes a housing 14 and a hatch 16. The housing is three-sided and the hatch selectively closes the fourth side. Hatch 16 is opened to load/unload the stack guide with cards when necessary or desired. In this embodiment, hatch 16 is openable on slide pivots 18 (see FIG. 3A) or otherwise openable. The overall internal peripheral dimension defined by housing 14 and hatch 16 are similar to one or more cards such that a stack of cards is receivable, organized in the guide 12 and ejectable from the guide 12.

Figure 3A:
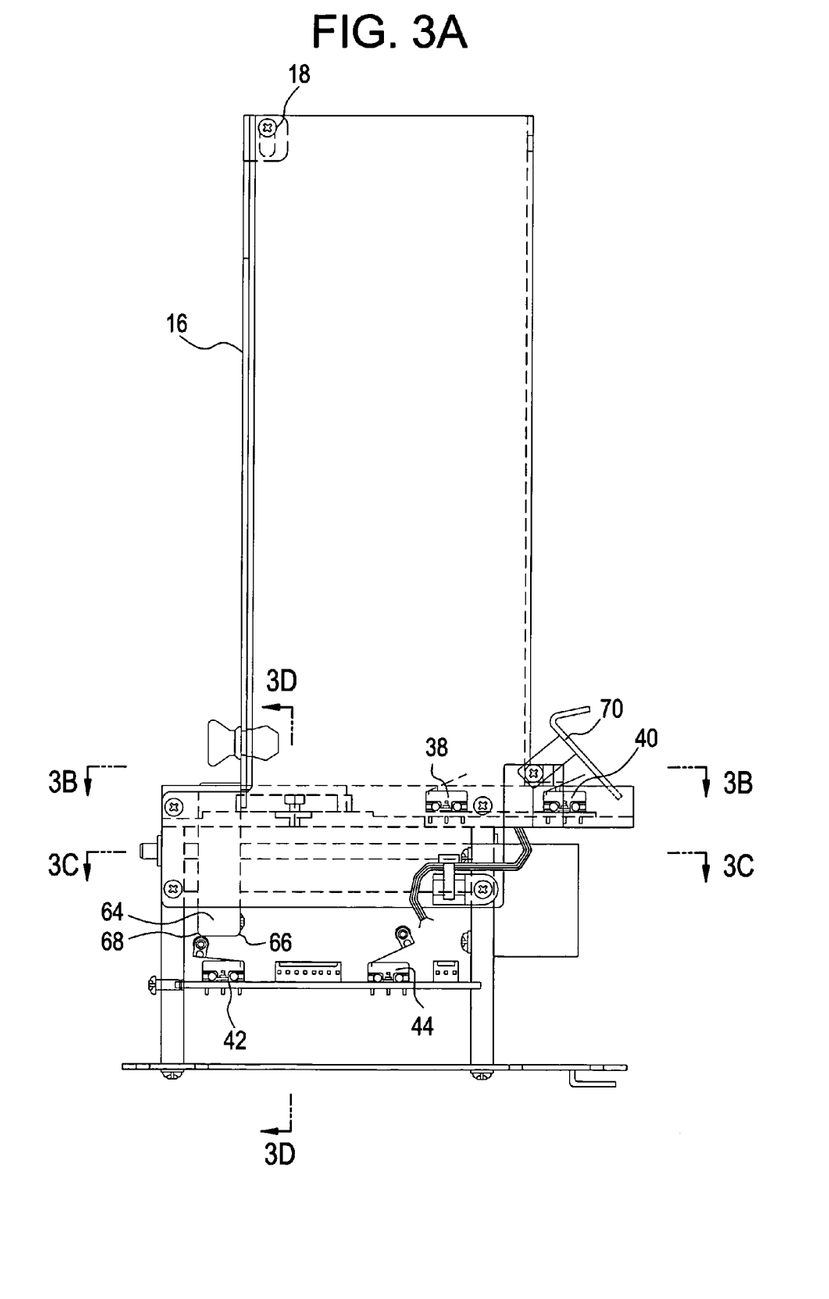
FIG. 3A is a side elevation view the card dispensing unit.
Figure 3B:
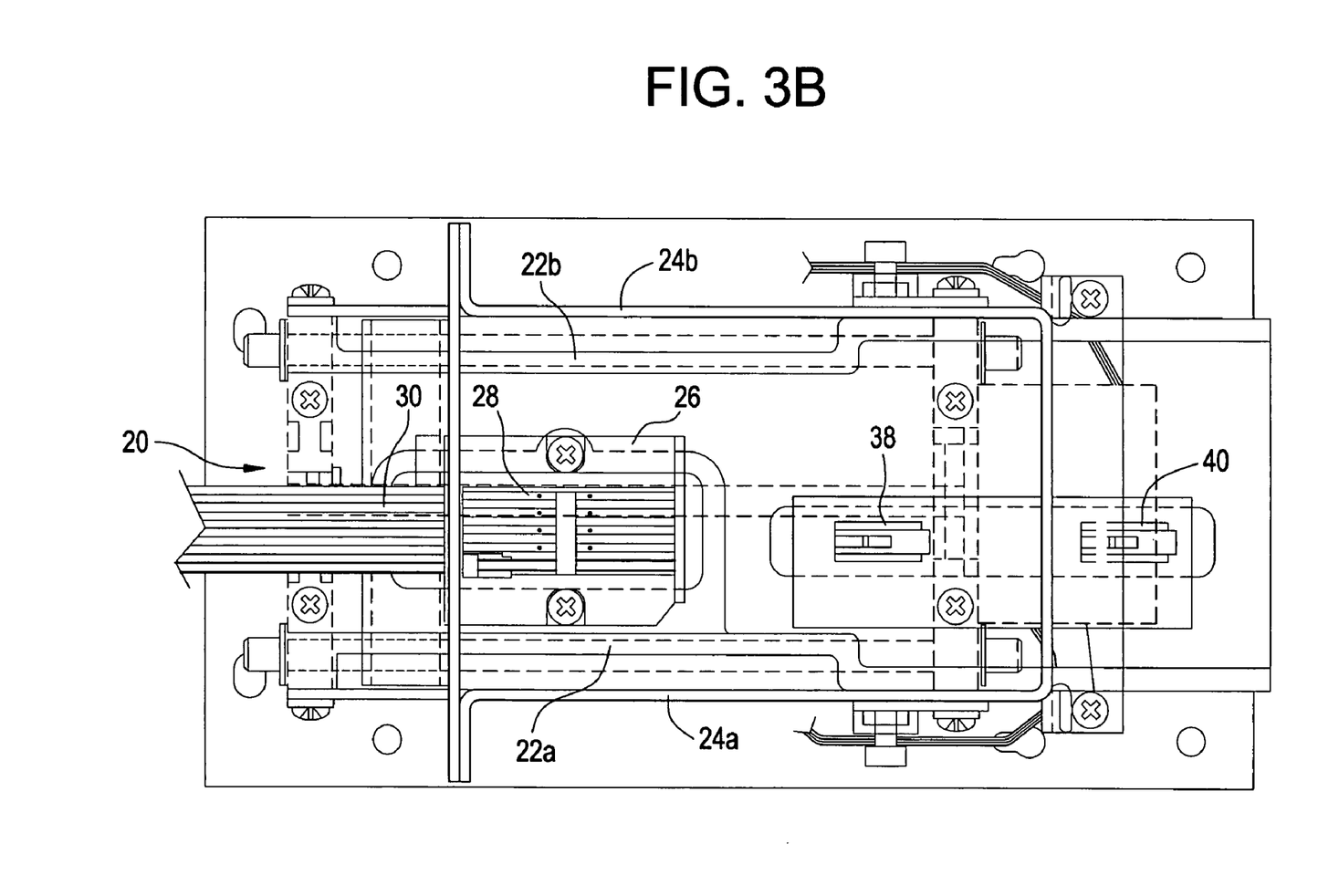
FIG. 3B is a cross-section view of the unit illustrated in FIG. 1A taken along section lines 3B—3B.
Figure 7:
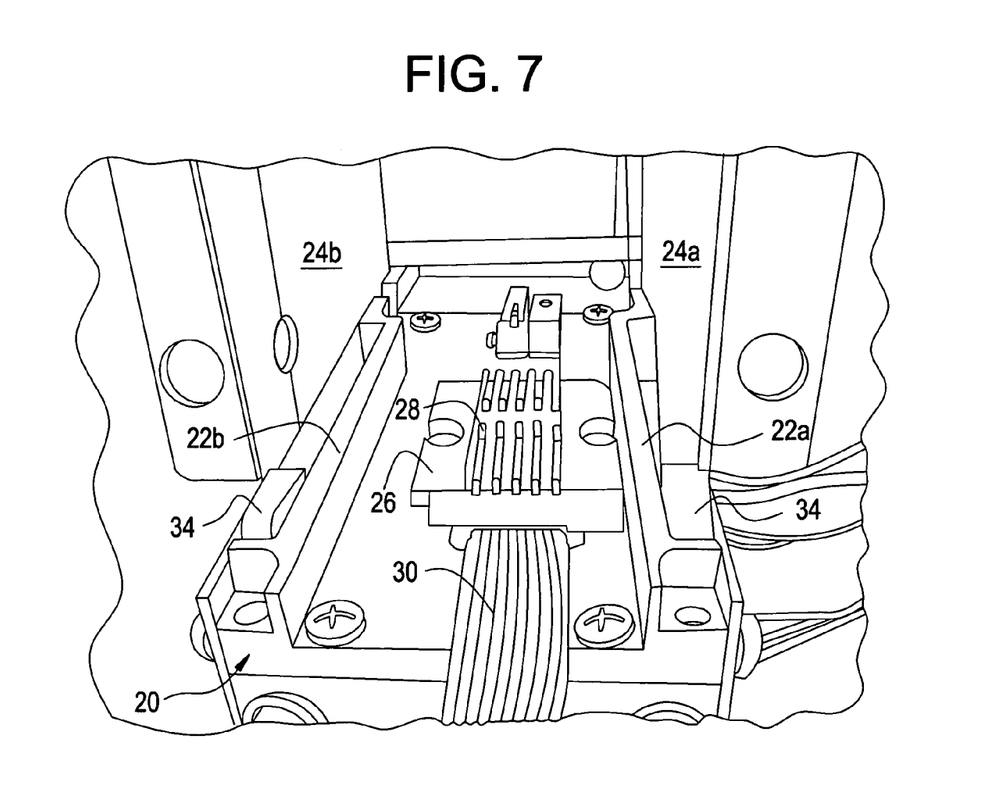
FIG. 7 is a similar view to FIG. 6 but with the rear hatch displaced.

Referring to FIGS. 3B and 7, a stack support 20 is attached to housing 14 to provide a subjacent support for the stack of cards when loaded. Stack support 20 includes a pair of ridges 22a and 22b upon which cards from the stack ride. It will be appreciated that the ridges are narrow relative to the width between housing walls 24a and 24b, which closely approximate card width. This is to reduce the area on the face of each card subject to potential scratching from the ridges to improve aesthetics of the ejected card.

Centrally of the ridges 22a and 22b is an encoder 26 having a plurality of (as illustrated 8) pins 28. Depressing of pins 28 requires about 1 to 1.5 pounds of force in one embodiment, which may be a downward force, but will always be an impingement force between the stack of cards and the encoder, thus urging the stack towards the encoder. The force is created by a means such as gravity, either by a stack of cards alone or with a weight placed thereon, or by a spring of any type. Upon compression of pins 28, the card may be programmed by encoder 26 as dictated by a control circuit (not shown) connected to encoder 26 through cable 30.

Figure 3C:
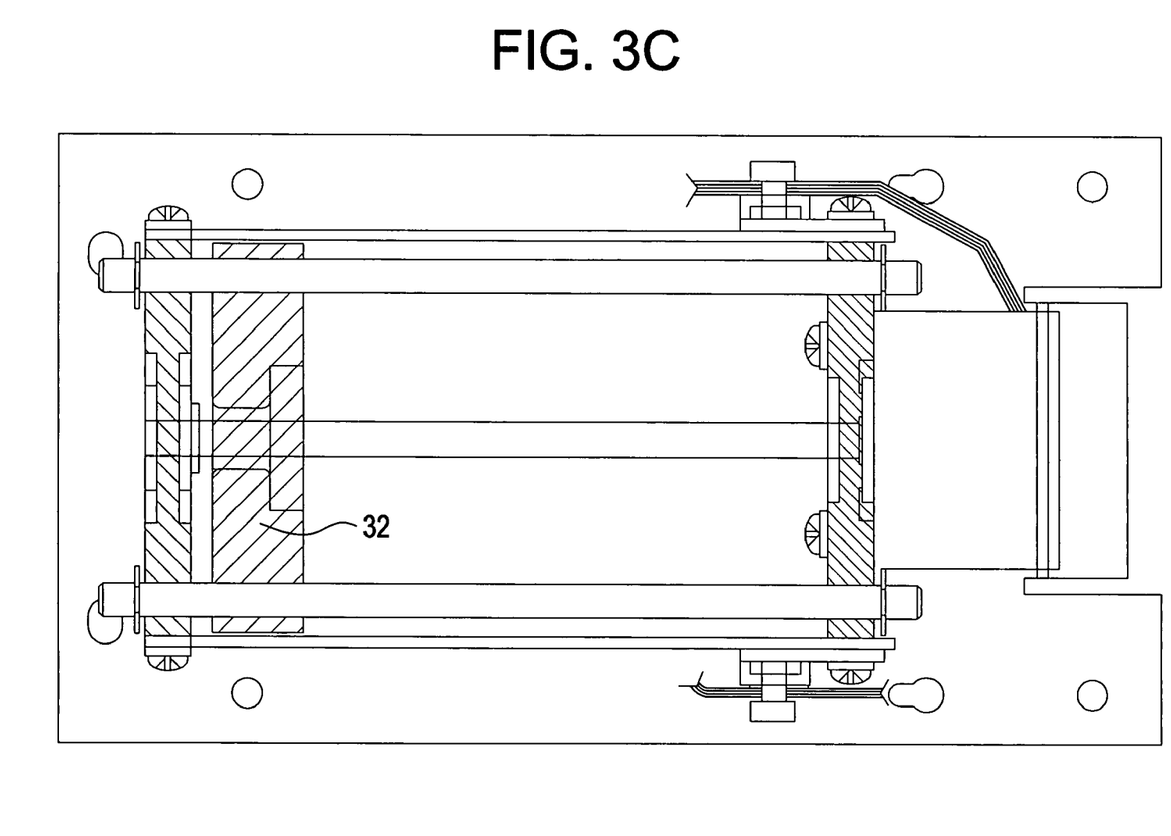
FIG. 3C is a cross-section view of the unit illustrated in FIG. 1A taken along section lines 3C—3C.
Figure 3D:
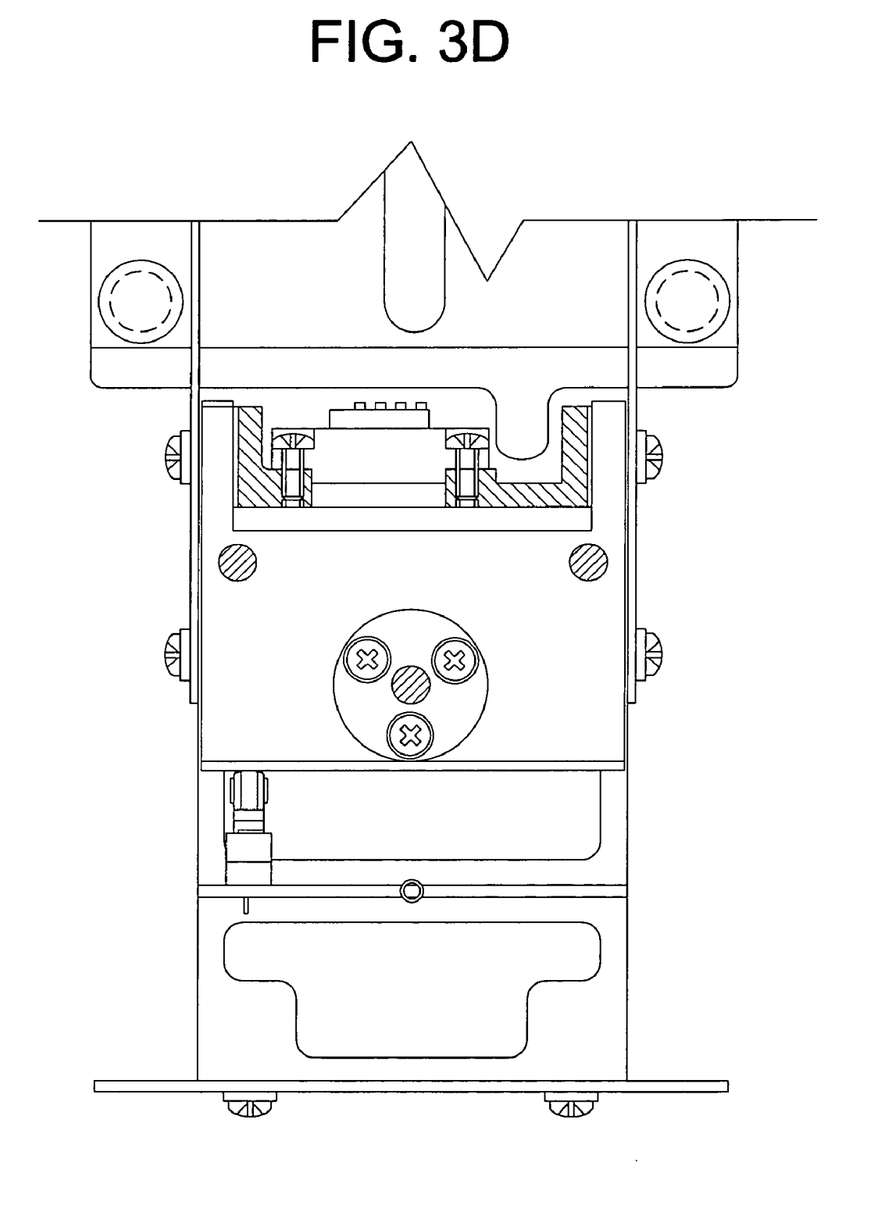
FIG. 3D is a cross-section view of the unit illustrated in FIG. 1A taken along section lines 3D—3D.
Figure 4A:
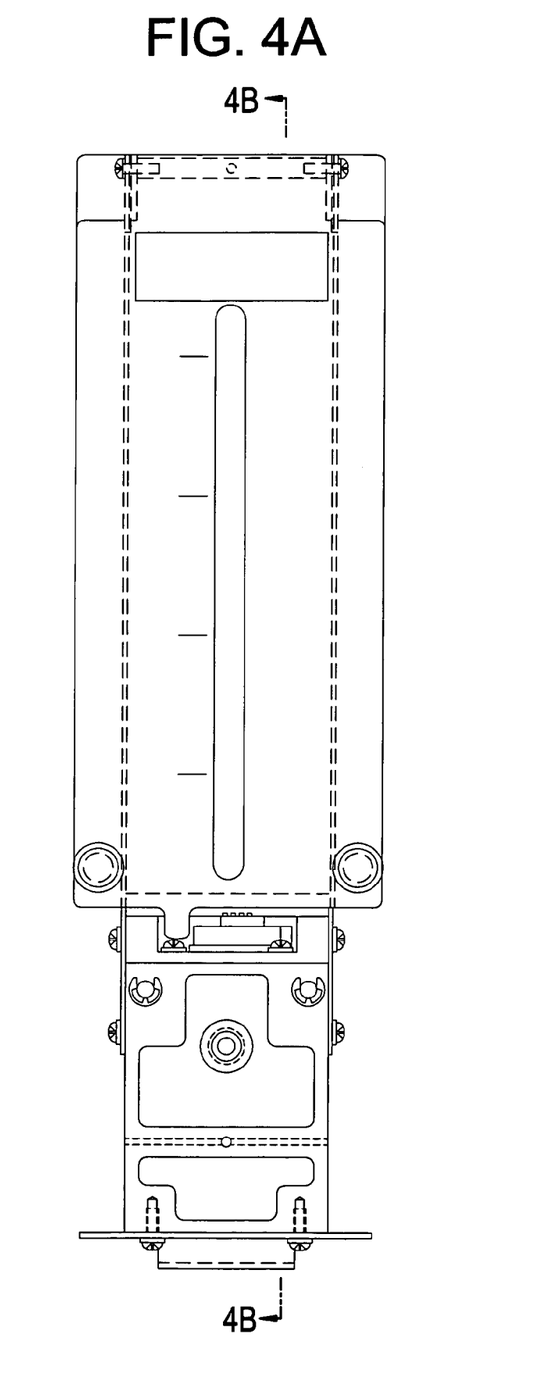
FIG. 4A is a rear elevation view of the card dispensing unit illustrated in FIG. 3A.
Figure 4B:
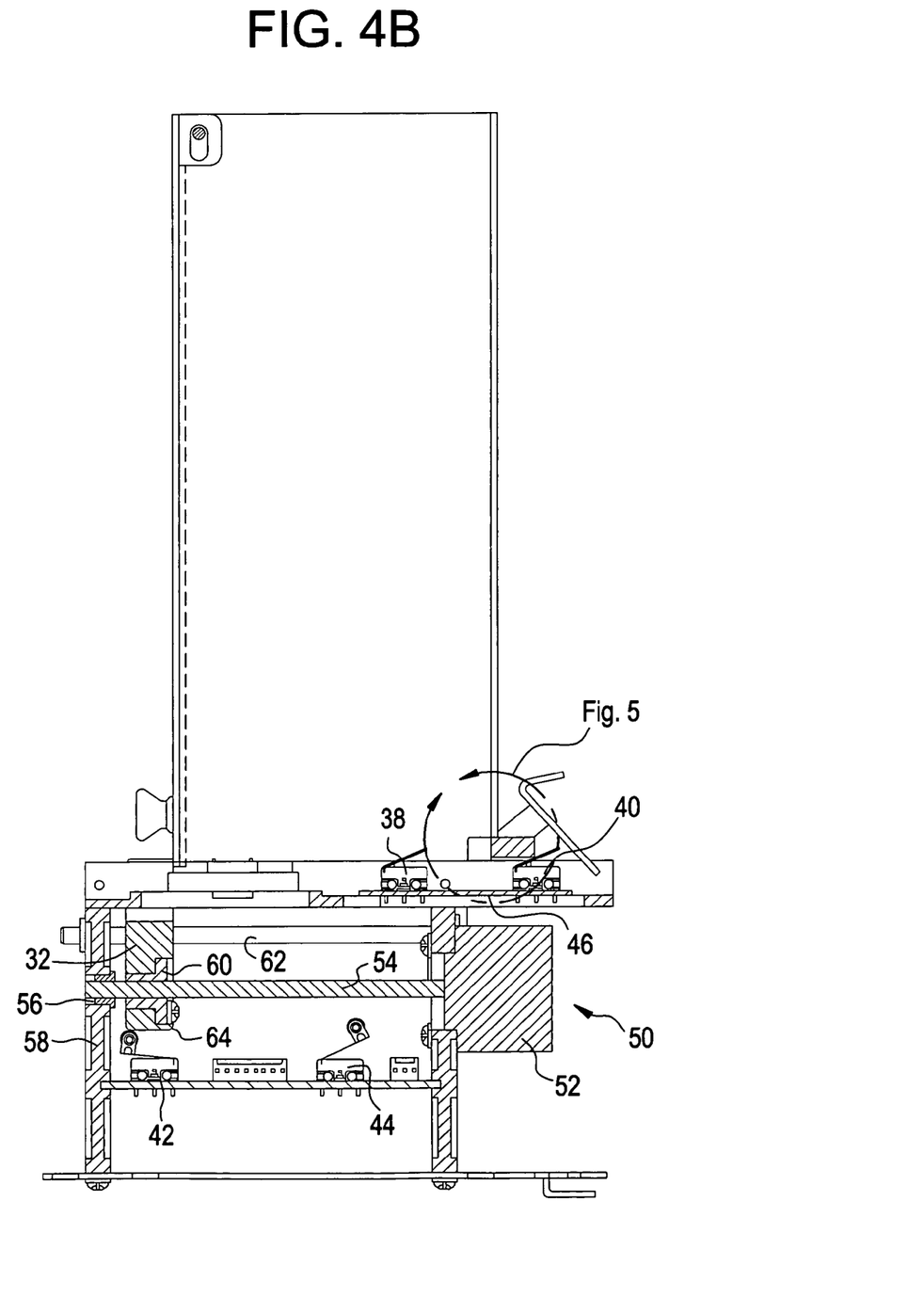
FIG. 4B is a cross-sectional view of the unit illustrated in FIG. 4A taken along section lines 4B—4B.
Figure 5:
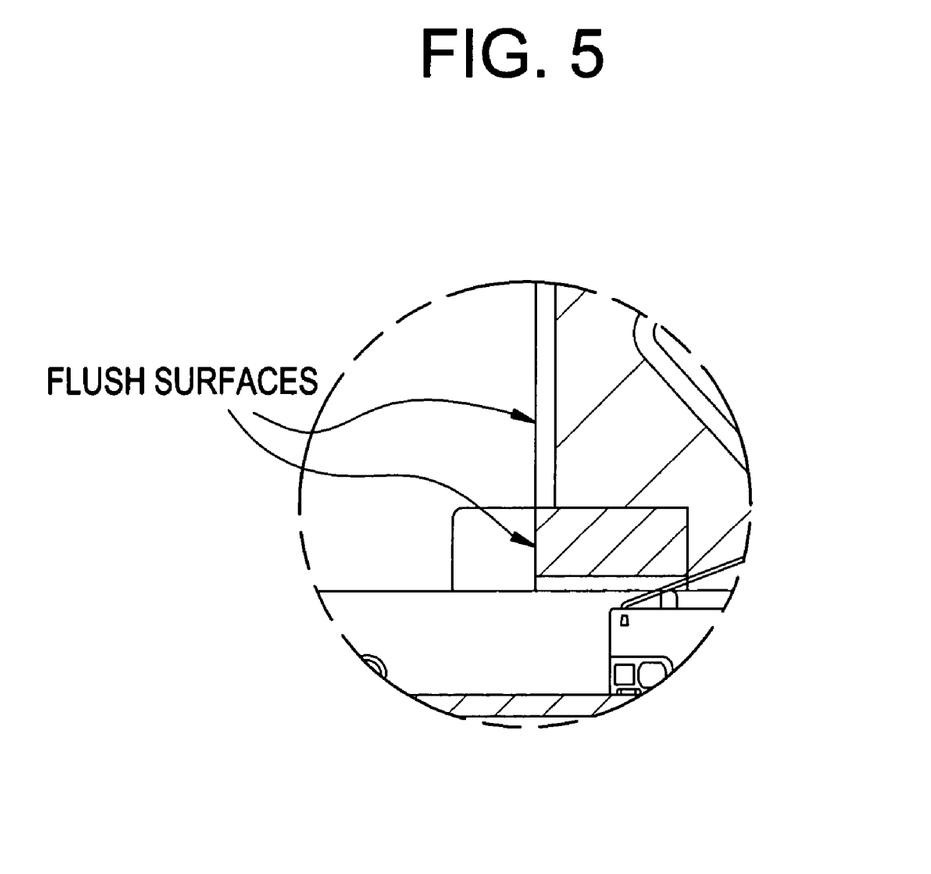
FIG. 5 is an enlarged view of circumscribed area 5—5 in FIG. 4B.
Figure 6:
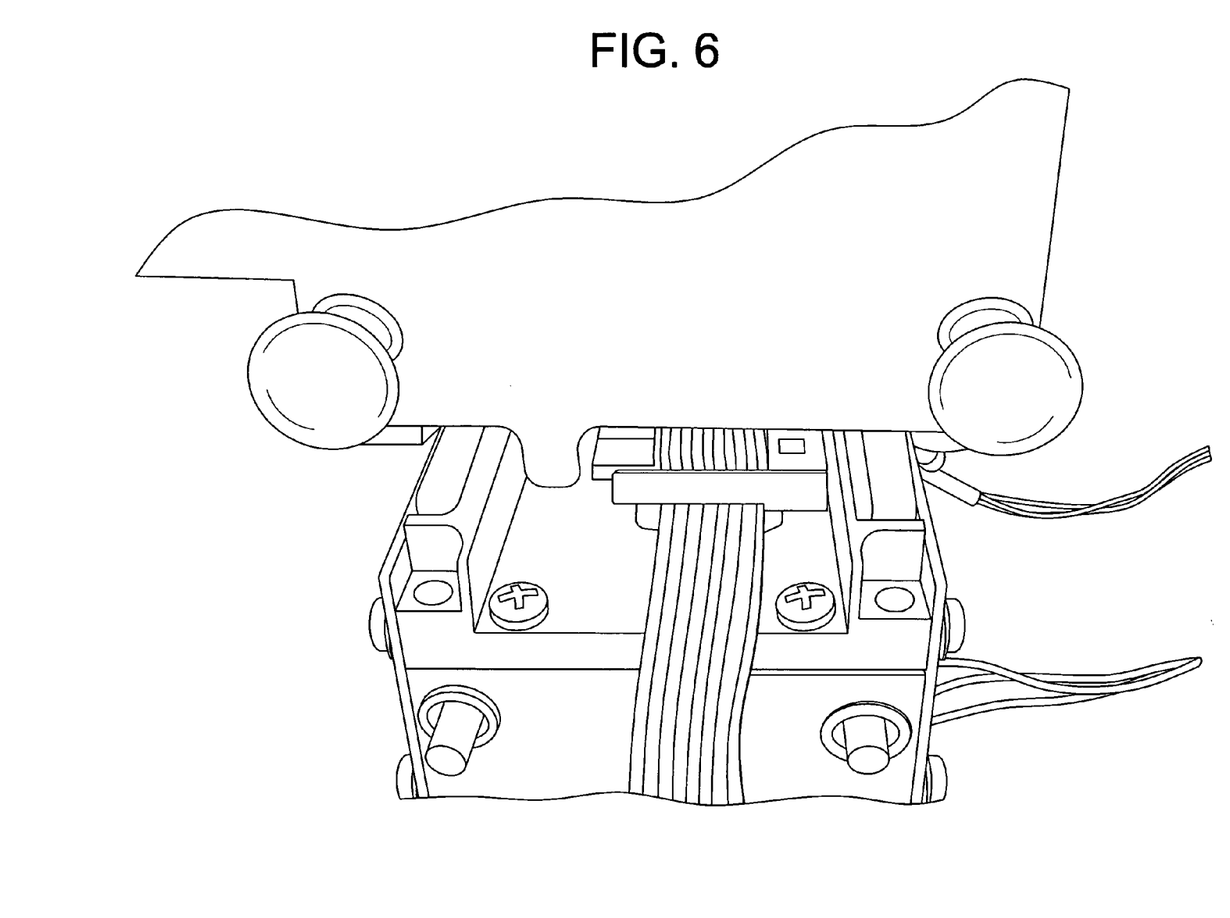
FIG. 6 is a perspective view of a rear end of the unit and illustrating a part of the encoder.

After completion of the encoding process, a push block 32 (see FIG. 3C) having tabs 34 (FIG. 7) is configured to push a single card off the bottom of the stack and to an ejection area 36. The ejection area 36 is visible in FIG. 1 in perspective view and in FIGS. 3A and 4B in side plan and cross-section view, respectively. It is well while viewing FIGS. 3A, 4B and 7 to also note a card present sensor 38 and a card out sensor 40, as well as (in FIGS. 3A and 4B), limit switches 42 and 44 both of which are connected to a control circuit, not shown. Further, the card present sensor 38 and card out sensor 40 are located on a separate printed circuit board 46 for ease of installation.

Beneath stack support 20 (FIGS. 3A, 3C and 4B) the controlled position linear actuator 50 is illustrated. Actuator 50 comprises in this embodiment, a stepper motor 52 having a lead screw 54 in operable communication therewith. Such motor is inherently position controllable and has been selected for that property. It will be appreciated that other devices allowing position control may be substituted without departing from the scope of the invention. The lead screw is supported by a bushing 56 in a support frame 58 at one end thereof and by the motor 52 at the other end thereof. It is to be appreciated that the importance of this component is to create a linear drive pattern with position control to support the desired card ejection process described hereinbelow. The position controlled nature of the linear actuator 50 allows for desired avoidance of pushback of a card into the stack whether it be intentionally or accidentally. The specifically illustrated embodiment has been developed and selected for illustration due to low cost and simplicity.

The push block 32 is in operable communication with the lead screw 54 through the intermediary of a flange nut 60 secured therein. The linear travel per step of the lead screw is about 0.001 inch. which is correlated to the speed of card delivery and the length of the card itself. Push block 32, while driven by lead screw 54, rides on rails 62. In this embodiment two rails 62 are employed.

At an end of push block 30, opposite tabs 34 is a limit leg 64, which in one embodiment, as illustrated, includes chamfers 66 and 68. The chamfers assist in the intended function of limit leg 64 to trigger limit switches 42 and 44 by reducing the angle of incidence between the components. As was noted above, it is emphasized that any type of limit switch, be it electrical, mechanical, optical, pneumatic, hydraulic, etc. may be substituted without departure from this disclosure. Depending upon the type of limit switch selected, in the illustrated embodiment, subminiature series limit switches with roller lever are employed. These are ubiquitously commercially available.

Finally, a front guard 70 is pivotally or otherwise displaceably mounted to support 20. In operation, guard 70 is pushed up and out of the way by an ejecting card but when there is no ejecting card assumes a position closing the ejectment opening. By so doing the front guard prevents insertion of a card improperly into the stack of dispensable cards.

Operation

The unit as described, reliably and efficiently dispenses cards while at the same time encoding them, avoiding defacement of them and avoiding card push-back. This is accomplished through the action of the controlled position linear actuator and the push block.

A stack of cards (one or more), which in many embodiments will be blank cards, are placed in stack guide 12. These cards are then urged toward the encoder 26 for encoding seriatim as paid for by a consumer. The cards are urged by gravity or other means as noted above, in a direction toward the encoder 26. An initialization procedure on powering the unit determines whether or not the push block is in the home position based upon a closed or open condition of limit switch 42. If the home position switch is open, it is not known whether the device is being powered from a maintenance shut down or power failure. Therefore, it is not known if a card has been partially ejected or not. The controller will therefore cause the apparently interrupted cycle to continue. The stepper motor 52 drives the lead screw 54 in a direction to move the push block 32 to the eject position as determined by limit switch 44 becoming closed. Upon achieving a closed position, the card present and card out sensors are checked for state. If they indicate a card has ejected and has not been taken, then the unit will hold position until the card is taken. If the card out sensor is open or becomes open upon card removal the stepper motor 52, drives the lead screw 54 in an opposite direction thereby moving the push block 32 toward the home position. This will continue until the home position limit switch 42 is put in the closed position. The initialization procedure is complete when the home position limit switch is closed. The unit is then ready for normal operation.

To operate the unit, a consumer tenders payment to another part of the card device (not shown) to set in motion the dispensing unit above described. Upon such action, a card in closest proximity to the encoder (bottom of the stack) is encoded with a selected batch of information which may include a monetary credit, a key for a certain type of manufacturer and even a key restricting the card to a particular facility or particular machine. Once the card is encoded, the control circuit energizes the stepper motor to run.

In one embodiment, the distance to dispense the card is 2.2 inches (exemplary and not limiting); the step distance is 0.001 inch per step and the desired dispensing time is about 3 seconds. For this example, the stepper motor should run at about 733 $H_z$. The frequency of the stepper motor will be dependent upon desired factors in each application such as distance per step and length of delivery as well as time for delivery.

The motor 52 drives the lead screw 54 to move the push block 32 from the home position toward the ejection area at the front of the unit. Tabs 34, which rise above ridge 22a and 22b by about the thickness of one card, push against a trailing edge of the card to urge it toward the front of the unit. Since the card chip and the encoder are both located proximate an edge of the card, which is the trailing edge of the card, scraping of the card face by pins of the encoder 26 is limited to a small portion of the trailing edge of the card, thereby the card face is aesthetically preserved. It is further preserved as noted above. As the card advances, the card out sensor 40 is put to the closed position and the front guard is lifted by the card. When the push block 32 limit leg 64 closes limit switch 44, the stepper motor stops and waits until the card out sensor returns to the open position which is occasioned by the consumer withdrawing the card from the machine. Once the open position of card out sensor 40 has been restored, push block 32 is returned to the home position by the stepper motor 52 and lead screw 54. The home position is signaled by closing of limit switch 42. The unit is then ready for the cycle to repeat, a new card from the stack having automatically advanced to proximity with encoder 26 upon push block 32 achieving the home position. In this position the unit is idle and will remain so until addressed by a consumer taking action to purchase a new card.

While preferred embodiments have been shown and described, modifications and substitutions may be made thereto without departing from the spirit and scope of the invention. Accordingly, it is to be understood that the present invention has been described by way of illustrations and not limitation.

What is claimed is:

1. A card dispensing unit comprising:
   a stack guide assembly configured to receive a stack of cards;
   an encoder to encode said stack of cards, wherein said encoder is positioned in relation to said stack guide assembly to receive a consistent impingent force from said stack of cards;

a push block in operable communication with the guide assembly, wherein the push block reciprocates between home and eject positions, said push block signaling disposal in said home and eject positions, said push block signaling disposal in said home and eject positions to a control circuit through limit devices; and a controllable position linear actuator in operable communication with the push block.

2. A card dispensing unit as claimed in claim 1 wherein the one or more cards are dispensable in single card increments.

3. A card dispensing unit as claimed in claim 1 wherein the actuator comprises a stepper motor in operable communication with the push block.

4. A card dispensing unit as claimed in claim 3 wherein the actuator comprises a lead screw in operable communication with the stepper motor and the push block.

5. A card dispensing unit as claimed in claim 1 further including a control circuit to control at least the linear actuator.

6. A card dispensing unit as claimed in claim 1 wherein said impingent force is created by a gravitational force exerted by said stack upon said encoder.

7. A card dispensing unit as claimed in claim 6 wherein upon activation of the unit, said encoder encodes a card in said stack that is in closest proximity to said encoder.

8. A card dispensing unit as claimed in claim 6 wherein the encoder is positioned, relative to the guide assembly and one or more cards, near a trailing portion of a card being dispensed.

9. A card dispensing unit as claimed in claim 1 wherein the unit is configured to avoid contacting a central portion of each card to minimize abrasion in a graphics area of each card.

10. A card dispensing unit as claimed in claim 1 wherein the stack guide assembly maintains the stack in position while the push block reciprocates.

11. A card dispensing unit as claimed in claim 1 wherein the push block, upon dispensing a card, prevents movement of the dispensed card back into the stack.

12. A card dispensing unit as claimed in claim 11 wherein the push block returns to a home position only after the dispensed card is withdrawn from the unit.

13. A card dispensing unit as claimed in claim 1 wherein the limit devices are one positioned to be activated when the push block reaches an intended end of travel at a home and an eject position.

14. A card dispensing unit as claimed in claim 1 wherein the limit devices are at least one of electrical, mechanical, hydraulic, pneumatic and optical.

15. A card dispensing unit as claimed in claim 1 wherein the stack guide includes a means for urging cards toward the push block.

16. A card dispensing unit as claimed in claim 15 wherein the means is a weight.

17. A card dispensing unit as claimed in claim 15 wherein the means is a spring.

18. A card dispensing unit as claimed in claim 15 wherein the means generates about one pound force toward the push block.

19. A method for dispensing cards comprising:

recognizing an indicator to dispense a card;

encoding the card in closest proximity to an encoder, wherein said encoder is positioned in relation to said stack guide assembly to receive a consistent impingent force from said stack of cards; and linearly urging the card from a stack of one or more cards toward an ejection area with controllable position linear actuator;

actuating a stepper motor in operable communication with a push block; and moving the push block from a home position to an eject position.

20. A method for dispensing cards as claimed in claim 19 wherein moving the push block includes maintaining the push block in the eject position until the card is removed from an ejection area.

21. A method for dispensing cards as claimed in claim 19 wherein the method further includes keying the card as the card is dispensed.

22. A method for dispensing cards as claimed in claim 21 wherein the keying is manufacturer specific.

23. A method for dispensing cards as claimed in claim 21 wherein the keying is location specific.

24. A method for dispensing cards as claimed in claim 19 wherein the actuator is in operable communication with a push block and the push block urges the dispensed card toward the ejection area by contacting the card on a trailing edge thereof.

* * * * *